United States Patent
Lu et al.

(10) Patent No.: US 7,917,782 B2
(45) Date of Patent: Mar. 29, 2011

(54) COMPUTER DEVICE HAVING DISPLAY DEVICE CAPABLE OF BEING AUTOMATICALLY TURNED OFF OR TURNED ON ACCORDING TO SWITCH MOTION OF HOST

(75) Inventors: Yue-Qin Lu, Shenzhen (CN); Tong Zhou, Shenzhen (CN)

(73) Assignees: Innocom Technology (Shenzhen) Co., Ltd., Shenzhen City, Guangdong Province (CN); Chimel Innolux Corporation, Miao-Li County (TW)

( * ) Notice: Subject to any disclaimer, the term of this patent is extended or adjusted under 35 U.S.C. 154(b) by 664 days.

(21) Appl. No.: 12/004,849

(22) Filed: Dec. 21, 2007

(65) Prior Publication Data

US 2008/0215898 A1     Sep. 4, 2008

(30) Foreign Application Priority Data

Dec. 22, 2006   (CN) .......................... 2006 1 0157901

(51) Int. Cl.
*G06F 1/00*        (2006.01)
(52) U.S. Cl. .................................................. 713/310
(58) Field of Classification Search .................. 713/310, 713/330
See application file for complete search history.

(56) References Cited

U.S. PATENT DOCUMENTS

| | | | |
|---|---|---|---|
| 5,389,952 A * | 2/1995 | Kikinis ........................... 345/212 |
| 5,524,249 A * | 6/1996 | Suboh ............................ 713/322 |
| 5,630,144 A * | 5/1997 | Woog et al. .................... 713/310 |
| 5,692,197 A * | 11/1997 | Narad et al. ................... 713/323 |
| 5,696,978 A * | 12/1997 | Nishikawa ..................... 713/324 |
| 5,760,759 A | 6/1998 | Tanaka et al. |
| 5,764,547 A * | 6/1998 | Bilich et al. ................... 713/321 |
| 5,884,085 A * | 3/1999 | Sakai et al. .................... 713/300 |
| 5,925,131 A * | 7/1999 | Novoa et al. ................... 713/300 |
| 5,944,830 A * | 8/1999 | Hong et al. .................... 713/324 |
| 5,961,647 A | 10/1999 | Kim et al. |
| 5,961,648 A * | 10/1999 | Choi et al. ..................... 713/323 |
| 6,081,902 A * | 6/2000 | Cho ............................... 713/330 |
| 6,515,655 B1 * | 2/2003 | Thornblad ..................... 345/211 |
| 6,725,382 B1 * | 4/2004 | Thompson et al. ............. 726/19 |
| 6,753,881 B1 * | 6/2004 | Callway et al. ................ 345/699 |
| 6,992,987 B2 * | 1/2006 | Kobayashi ..................... 370/252 |
| 7,211,969 B2 | 5/2007 | Chou et al |
| 7,634,675 B2 * | 12/2009 | Liebenow ...................... 713/324 |
| 7,689,842 B2 * | 3/2010 | Anderson et al. ............. 713/310 |
| 2006/0248363 A1 * | 11/2006 | Chen et al. ..................... 713/300 |

FOREIGN PATENT DOCUMENTS

CN          1420413 A       5/2003
TW         200518013 A      6/2005

* cited by examiner

*Primary Examiner* — Paul R Myers
(74) *Attorney, Agent, or Firm* — Wei Te Chung

(57) ABSTRACT

An exemplary computer device (10) includes a host (11) configured for generating a turn on signal when the host is turned on, and a turn off signal when the host is turned off; and a display device (13) including a display unit (131) and an automatic control circuit (12). The automatic control circuit is configured for receiving the turn on signal and the turn off signal and turning on or turning off the display unit according to the received the turn on signal and the turn off signal. Thus when the host of the computer is turned on or turned off, the display unit of computer device can be automatically turned off or turned on according to a switch instruction of the host.

12 Claims, 2 Drawing Sheets

COMPUTER DEVICE HAVING DISPLAY DEVICE CAPABLE OF BEING AUTOMATICALLY TURNED OFF OR TURNED ON ACCORDING TO SWITCH MOTION OF HOST

FIELD OF THE INVENTION

The present invention relates to a computer device having a display device which is capable of being automatically turned off or turned on according to a switch instruction of a host.

GENERAL BACKGROUND

Computer devices have been widely used in all kinds of technology fields such as scientific calculation, industry control, and information processing.

Normally, a computer device includes a host and a display device connected to the host. When the computer device is ready to start working, an external power supply is respectively supplied to the host and the display device. Power supply circuits of the host and the display device start working respectively. When an operator presses power on/off buttons of the display device and the host, the display device and the host are turned on respectively. On the other hand, when the computer device is ready to shut down, a program stored in the host need to be performed. Then the operator presses the power on/off button of the display device to turn off the display device. Finally, the external power supplied to the host and the display device should be disconnected, in order to prevent accidental operation of the power supply circuits of the host and the display device. All in all, the process for turning on or turning off the computer device is complex and inconvenient for the user.

It is desired to provide a computer device which can overcome the above-described deficiencies.

SUMMARY

In one preferred embodiment, a computer device includes a host configured for generating a turn on signal when the host is turned on, and a turn off signal when the host is turned off; and a display device including a display unit and an automatic control circuit. The automatic control circuit is configured for receiving the turn on signal and the turn off signal and turning on or turning off the display unit according to the received the turn on signal and the turn off signal.

Other novel features and advantages will become more apparent from the following detailed description when taken in conjunction with the accompanying drawings.

DETAILED DESCRIPTION OF PREFERRED EMBODIMENTS

Reference will now be made to the drawings to describe the present invention in detail.

Figure 1:
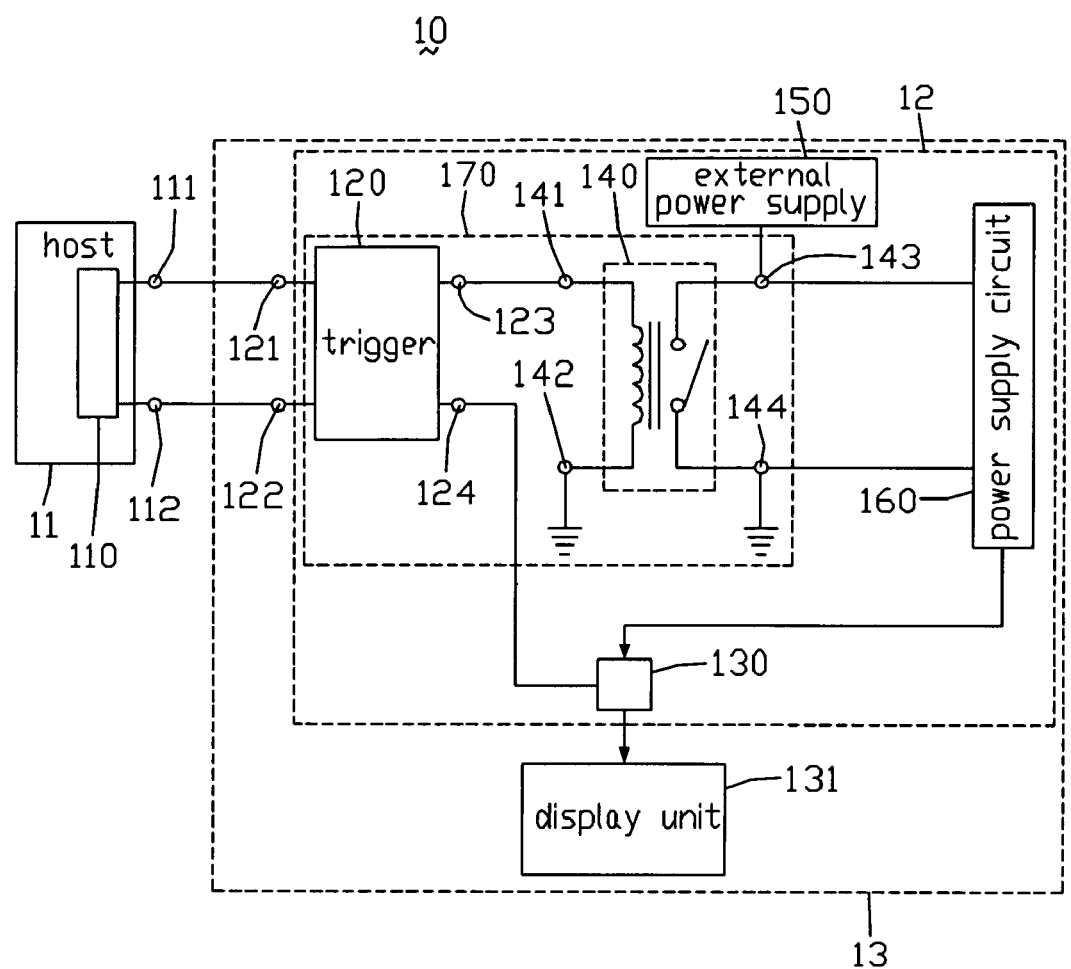
FIG. 1 is essentially a circuit diagram of a computer device according to a first embodiment of the present invention.

Referring to FIG. 1, a computer device 10 according to a first embodiment of the present invention is shown. The computer device 10 includes a host 11 and a display device 13.

The host 11 includes a digital visual interface (DVI) input/output 110 configured to provide a turn on/off signal according to a switch instruction of the host. The DVI input/output 110 includes a first output 111 for outputting a turn on signal, and a second output 112 for outputting a turn off signal.

The display device 13 includes a display unit 131, and an automatic control circuit 12 configured to turn on or turn off the display unit 131. Both the display unit 131 and the automatic control circuit 12 are integrated in the display device 13.

The automatic control circuit 12 includes a controller 170, a switching unit 130, an external power supply 150, and a power supply circuit 160.

The switching unit 130 includes a controlling terminal (not labeled), a first conducting terminal (not labeled), and a second conducting terminal (not labeled).

The controller 170 includes a trigger 120 and a relay 140. The trigger 120 includes a first input 121 connected to the first output 111 of the DVI input/output 110, a second input 122 connected to the second output 112 of the DVI input/output 110, a third output 123, and a fourth output 124 connected to the controlling terminal of the switching unit 130.

The relay 140 includes a third input 141 connected to the third output 123 of the trigger 120, a fourth input 142 connected to ground, a fifth output 143 connected to the external power supply 150, and a sixth output 144 connected to ground. The power supply circuit 160 is connected between the fifth and sixth outputs 143, 144 of the relay 140.

The power supply circuit 160 is connected to the display unit 131 via the first and second conducting terminals of the switching unit 130.

Typical operation of the computer device 10 is as follows. When the host 11 is turned on, a first high level voltage is generated and provided to the first output 111 of the DVI input/output 110, and there is no signal at the second output 112 of the DVI input/output 110. The first high level voltage is provided to the first input 121 of the trigger 120. Thus the trigger 120 generates a second high level voltage, and provides the second high level voltage to the third input 141 of the relay 140. Accordingly, a current is generated and flows through a winding (not labeled) of the relay 140 connected between the third and fourth inputs 141, 142. The current flow in the winding generates electromagnetism, which attracts an elastic switch member (not labeled) of the relay 140. The switch member moves under the magnetic force and closes a circuit of the relay 140, thereby electrically connecting the fifth and the sixth outputs 143, 144 of the relay 140. Thus the power supply circuit 160 is connected to the external power supply 150, and sn operating voltage is generated by the power supply circuit 160.

Furthermore, the trigger 120 generates a low level voltage upon receiving the first high level voltage, and provides the low level voltage to the controlling terminal of the switching unit 130. Thereby, the switching unit 130 is switched on. The power supply circuit 160 is connected to the display unit 131 via the activated switching unit 130, and the operating voltage is provided to the display unit 131 in order to drive the display unit 131. Thus the display device 13 is turned on.

When the host 11 is turned off, a third high level voltage is generated and provided to the second output 112 of the DVI input/output 110, and there is no signal at the first output 111 of the DVI input/output 110. The third high level voltage is provided to the second input 122 of the trigger 120. Thus the trigger 120 generates a fourth high level voltage, and provides the fourth high level voltage to the controlling terminal of the switching unit 130 via the fourth output 124. Thereby, the switching unit 130 is switched off. The power supply circuit 160 is electrically disconnected from the display unit 13, and the operating voltage is no longer provided to the display unit 131.

Furthermore, the trigger 120 generates a low level voltage upon receiving the third high level voltage, and provides the low level voltage to the third input 141 of the relay 140. Accordingly, no current flows through the winding of the relay 140, and the switch member rebounds and opens said circuit of the relay 140. Thereby, the fifth and the sixth outputs 143, 144 of the relay 140 are electrically disconnected. The power supply circuit 160 is disconnected from the external power supply 150, and stops working. Thus the display device 13 is turned off.

Because the DVI input/output 110 generates a turn on/off signal according to a switch instruction of the host 11, the controller 170 can automatically connect/disconnect the power supply circuit 160 to/from the external power supply 150 according to the turn on/off signal. Furthermore, the automatic control circuit 12 can automatically connect/disconnect the power supply circuit 160 to/from the display unit 131 by controlling the switching unit 130 according to the turn on/off signal. Therefore when the host 11 of the computer 10 is turned on or turned off, the display unit 131 of computer device 10 can be automatically turned off or turned on according to the switch instruction of the host 11. Thus the computer device 10 is convenient for an operator to use.

Figure 2:
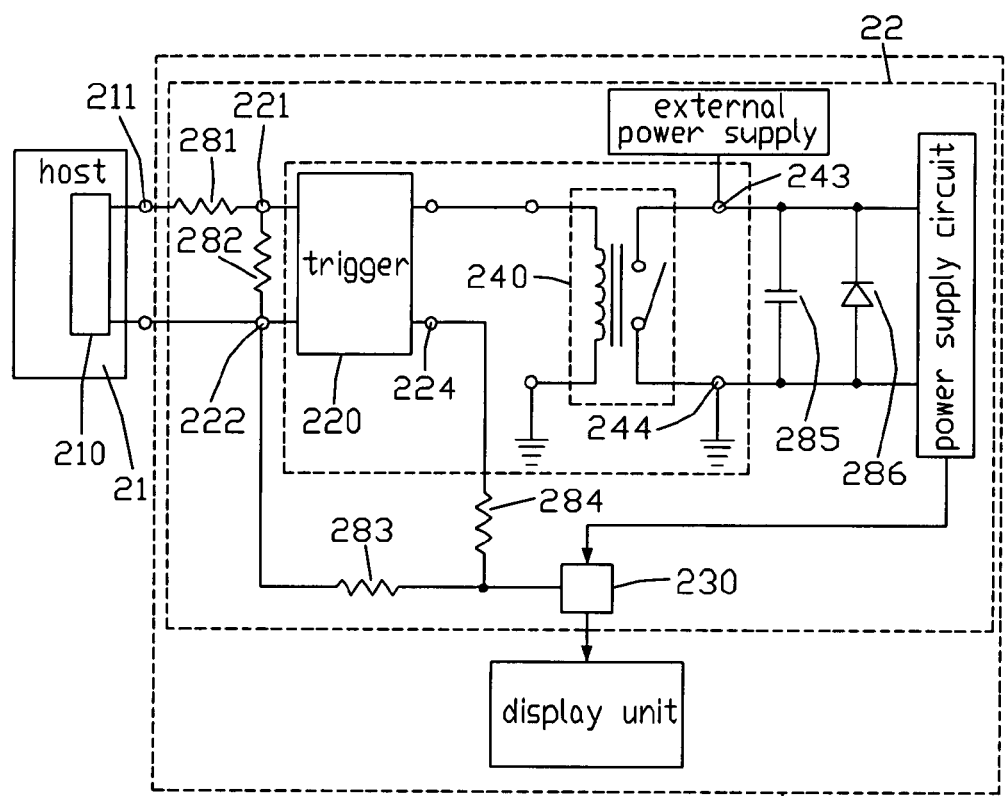
FIG. 2 is essentially a circuit diagram of a computer device according to a second embodiment of the present invention.

Referring to FIG. 2, a computer device 20 according to a second embodiment of the present invention is similar to the computer device 10. However, a display device 23 of the computer device 20 further includes a first resistor 281, a second resistor 282, a third resistor 283, a fourth resistor 284, a capacitor 285, and a voltage stabilizing diode 286.

The first resistor 281 is connected between a first output 211 of a DVI input/output 210 of a host 21 and a first input 221 of a trigger 220. The second resistor 282 is connected between the first input 221 of the trigger 220 and a second input 222 of the trigger 220. The third resistor 283 is connected between the second input 222 of the trigger 220 and a controlling terminal of a switching unit 230. The fourth resistor 284 is connected between the controlling terminal of the switching unit 230 and a fourth output 224 of the trigger 220. The capacitor 285 and the voltage stabilizing diode 286 are connected in parallel, between two outputs 243, 244 of a relay 240.

The first, second, third, and fourth resistors 281, 283, 283, 284 are configured for limiting current and protecting the computer device 20. Typically, a resistance of the first resistor 281 is approximately equal to 100Ω (ohms). A resistance of each of the second and third resistors 282 is approximately equal to 4.7KΩ (kiloohms). A resistance of the fourth resistor 284 is approximately equal to 1KΩ. A capacitance of the capacitor is approximately equal to 0.1 μF (microfarads).

In alternative embodiments, the host 11, 21 of the computer device 10, 20 can generate the turn on/off signal and provide the turn on/off signal to the automatic control circuit 12, 22 via a video graphics array (VGA) input/output thereof instead of the DVI input/output 110/210.

It is to be further understood that even though numerous characteristics and advantages of preferred and exemplary embodiments have been set out in the foregoing description, together with details of the structures and functions of the embodiments, the disclosure is illustrative only; and that changes may be made in detail, especially in matters of arrangement of parts within the principles of the present invention to the full extent indicated by the broad general meaning of the terms in which the appended claims are expressed.

What is claimed is:

1. A computer device, comprising:
a host comprising a digital visual interface (DVI) input/output, the DVI input/output comprising a first output for outputting a turn on signal when the host is turned on and a second output for outputting a turn off signal when the host is turned off;
a display device comprising a display unit and an automatic control circuit, the automatic control circuit being configured for turning on or turning off the display unit according to the turn on signal or turn off signal;
wherein the automatic control circuit comprises a controller, an external power supply, a power supply circuit, and a switching unit connected between the power supply circuit and the display unit, the controller is configured for turning on or turning off the switching unit according to the turn on signal or turn off signal, and the controller is further configured for connecting or disconnecting the power supply circuit to the external power supply according to the turn on signal or turn off signal;
wherein the controller comprises a trigger and a relay, the trigger is configured for controlling the relay according to the turn on signal or turn off signal thereby connecting or disconnecting the power supply circuit to the external power supply, and the trigger is further configured for turning on or turning off the switching unit;
wherein the switching unit comprises a controlling terminal, the switching unit is turned on when a low level voltage generated by the trigger is provided to the controlling terminal, and the switching unit is turned off when a high level voltage generated by the trigger is provided to the controlling terminal; and
wherein the trigger comprises a first input connected to the first output of the DVI input/output, a second input connected to the second output of the DVI input/output, a third output, and a fourth output connected to the controlling terminal of the switching unit, the relay comprises a third input connected to the third output of the trigger, a fourth input connected to ground, a fifth output connected to the external power supply, and a sixth output connected to ground, and the power supply circuit is connected between the fifth and sixth outputs of the relay.

2. The computer device as claimed in claim 1, further comprising a resistor connected between the first output of the DVI input/output of the host and the first input of the trigger.

3. The computer device as claimed in claim 2, wherein a resistance of the resistor is approximately equal to 100Ω (ohm).

4. The computer device as claimed in claim 1, further comprising a resistor connected between the first input of the trigger and the second input of the trigger.

5. The computer device as claimed in claim 4, wherein a resistance of the resistor is approximately equal to 4.7KΩ.

6. The computer device as claimed in claim 1, further comprising a resistor connected between the second input of the trigger and the controlling terminal of the switching unit.

7. The computer device as claimed in claim 6, wherein a resistance of the resistor is approximately equal to 4.7KΩ.

8. The computer device as claimed in claim 1, further comprising a resistor connected between the controlling terminal of the switching unit and the fourth output of the trigger.

9. The computer device as claimed in claim 8, wherein a resistance of the resistor is approximately equal to 1KΩ.

10. The computer device as claimed in claim 1, further comprising a capacitor and a voltage stabilizing diode connected in parallel between the fifth and sixth outputs of the relay.

11. The computer device as claimed in claim 10, wherein a capacitance of the capacitor is approximately equal to 0.1 μF.

12. The computer device as claimed in claim 1, wherein the automatic control circuit and the display unit are integrated together in the display device.

* * * * *